United States Patent
Kelly

(10) Patent No.: US 6,696,962 B2
(45) Date of Patent: Feb. 24, 2004

(54) RESONANT TUBE LEVEL SENSOR

(76) Inventor: John M. Kelly, 7511 Snowpea Ct. Unit M, Alexandria, VA (US) 22306

( * ) Notice: Subject to any disclaimer, the term of this patent is extended or adjusted under 35 U.S.C. 154(b) by 243 days.

(21) Appl. No.: 09/854,500

(22) Filed: May 14, 2001

(65) Prior Publication Data

US 2002/0167413 A1 Nov. 14, 2002

(51) Int. Cl.⁷ .............................................. G08B 21/00
(52) U.S. Cl. ....................... 340/612; 340/613; 340/617; 340/621
(58) Field of Search ................. 340/612, 613, 340/616, 617, 503, 502, 621, 573.6

(56) References Cited

U.S. PATENT DOCUMENTS

| | | | | |
|---|---|---|---|---|
| 2,584,128 A | * | 2/1952 | Hildyard | 331/65 |
| 3,810,172 A | * | 5/1974 | Burpee et al. | 342/27 |
| 4,189,722 A | * | 2/1980 | Lerner | 367/93 |
| 4,383,443 A | * | 5/1983 | Langdon | 73/290 V |
| 4,594,584 A | * | 6/1986 | Pfeiffer et al. | 340/620 |
| 4,811,595 A | * | 3/1989 | Marciniak et al. | 73/149 |
| 4,853,694 A | * | 8/1989 | Tomecek | 340/621 |
| 4,890,266 A | * | 12/1989 | Woodward | 367/99 |
| 5,043,912 A | * | 8/1991 | Reus | 702/54 |
| 5,128,656 A | | 7/1992 | Watanabe | |
| 5,644,299 A | * | 7/1997 | Cruickshank | 340/617 |
| 5,917,776 A | * | 6/1999 | Foreman | 367/93 |
| 6,142,015 A | * | 11/2000 | Getman et al. | 73/290 V |

FOREIGN PATENT DOCUMENTS

JP          60-093314      * 10/1983      ........... G01F/17/00

* cited by examiner

*Primary Examiner*—Benjamin C. Lee
*Assistant Examiner*—Son Tang

(57) ABSTRACT

Acoustic level sensing by creating, or failing to create, resonance in a tube having a free end. An acoustic transducer at one end of the tube injects sound at a frequency that could produce resonance, depending on whether the free end is open or closed. The drive to the acoustic transducer is then removed, and the sound decay in the tube is monitored to determine if resonance occurred. Based on that determination, a signal is produced that indicates whether a material has or has not closed the free end of the tube. Beneficially, the same acoustic transducer that produces the sound monitors the sound decay. To determine whether resonance has occurred, or to verify system operation, the sound decay at the possible resonant frequency can be compared to the decay at another frequency. Temperature compensation can be performed by attempting to produce resonance at a plurality of frequencies.

20 Claims, 1 Drawing Sheet

RESONANT TUBE LEVEL SENSOR

FIELD OF THE INVENTION

This invention relates to detecting the level of a material. More particularly, this invention relates to using the resonant frequency of a tube to detect if a material has reached a specified level.

BACKGROUND OF THE INVENTION

It is often necessary to determine whether the surface of a material is above or below a particular level. This determination is often referred to as point level sensing. Numerous types of point level sensors are known. With liquids, magnetic floats can be used in conjunction with magnetically operated switches. The switches are located at fixed positions in a tank. When the magnetic float reaches a switch that switch's state changes.

While floats are useful, their operation depends upon mechanical movement and upon the density or densities of one or more liquids. Floats are generally not suitable for sensing solids (including powders), thick or clinging liquids, and foams. Furthermore, floats are often rather large and are subject to leaks and other failures.

Another type of point level sensor is the vibrating rod. In such sensors a rod element that vibrates at a specific frequency is located at a particular level. When a material comes into contact with the rod element the vibrations either stop or the vibration frequency changes. However, such sensors tend to be relatively large, sensitive to thick, clinging materials, and expensive. Furthermore, with vibrating rod sensors it is difficult to sense light objects, such as fine powders and foams.

Many other types of point level sensing systems are known, including ultrasonic, radiation, thermal conductivity, paddle wheels, and slow-wave time-domain reflectometry. However, some of these systems are expensive, some are inaccurate, some are subject to clogging, others are difficult to use, while others are difficult to manufacture. In any event, soft materials, foams, and materials that cling remain difficult to sense.

Another type of point level sensing uses acoustic waves. For example, U.S. Pat. No. 5,128,656, entitled "Level Detecting Method and its Apparatus" issued on Jul. 7, 1992 to Watanabe teaches a method of point level sensing that uses stationary waves in a tube. According to that patent, a tube having one end free and an acoustic source at the other end is located such that the free end is at the predetermined position. The acoustic source then generates acoustic waves that are capable of producing standing waves having either a node or an antinode at the free end. If a material closes the free end, depending on whether nodes or antinodes are used, standing waves are either produced or extinguished. From the existence or absence of the standing waves a determination is made as to whether the material had reached the predetermined level. In particular, Watanabe teaches determining if standing waves are present by sensing the impedance of the sound source. The acoustic method of U.S. Pat. No. 5,128,656 has the advantage that even very light materials, such as feathers and cotton, can be sensed.

U.S. Pat. No. 5,128,656 is based on the physics of resonant tubes. A tube having an effective length L that is filled with a medium having a speed of sound of c can produce two different sets of resonant frequencies. If the tube is closed at both ends (or open at both ends) the possible resonant frequencies are:

$$f_{nc} = nc/2L,$$

where $n = 1, 2, 3, \ldots$

If the tube is open at one end and closed at the other end the possible resonant frequencies are:

$$f_{no} = (2n-1)c/4L,$$

wherein $n = 1, 2, 3, \ldots$

While U.S. Pat. No. 5,128,656 may be useful, it may not be optimal. It appears to have drawbacks in that its method of sensing resonance is not particularly easy to implement, it may have operational reliability problems, and it appears to be difficult to use with caustic vapors.

Therefore, a new level sensor based on the physics of resonant tubes would be beneficial.

SUMMARY OF THE INVENTION

The principles of the present invention provide for point level sensors that can sense the level of a material. Advantageously, the principles of the present invention can enable level sensors capable of detecting the level of many materials, including very light solids, such as feather, cotton, and powders, and of almost all liquids, including highly viscous liquids that tend to cling.

A level sensor according to the principles of the present invention includes a tube having a sensor end and an acoustic transducer at the other end. A driver circuit drives the acoustic transducer in an attempt to produce a standing wave in the tube. After a time sufficient to produce a standing wave the driver circuit stops driving the acoustic transducer. A sensing network then monitors the decay of the acoustic waves in the tube to determine if a standing wave was produced. Based on that determination, a level signal is produced that indicates whether a material has closed the sensor end of the tube.

According to one embodiment of the present invention, the driver circuit drives the acoustic transducer with a frequency that would produce standing waves if the sensor end is open. If a standing wave is produced, as determined by the acoustic decay in the tube, a level signal indicates that the material has not reached the sensor end.

Beneficially, the driver circuit also drives the acoustic transducer at a frequency that cannot produce a standing wave (resonance). In that case, the presence of a standing wave is determined by comparing the acoustic decay in the tube at the possible resonant frequency against the acoustic decay in the tube at the frequency that cannot produce resonance.

Even more beneficially, the driver circuit also drives the acoustic transducer at a plurality of possible resonant frequencies in an attempt to find a resonant frequency. This enables temperature compensation and provides an easy method of compensating for changing vapor concentrations in the tube.

Also beneficially, the driver circuit drives the acoustic transducer in an attempt to produce a resonant frequency when the sensor end is closed. This enables a fail-safe approach in that the tube must be either open or closed (neglecting a small "transition range" where the tube is neither open nor closed).

According to another embodiment of the present invention, the driver circuit drives the acoustic transducer in an attempt to produce standing waves when the sensor end is closed. If a standing wave occurs, as determined by acoustic decay in the tube, a level signal indicates that the material being sensed has reached the sensor end.

Beneficially, the driver circuit further drives the acoustic transducer at a frequency that cannot produce a resonance. Then, the presence of a standing wave is determined by comparing the acoustic decay in the tube at the possible resonant frequency with the acoustic decay in the tube at the frequency that cannot produce resonance.

Even more beneficially, the driver circuit also drives the acoustic transducer at a plurality of possible resonant frequencies in an attempt to find a resonant frequency. This enables temperature compensation, compensation of the vapor in the tube, and compensates for a material that rises into the tube.

Alternatively or in addition, the driver circuit drives the acoustic transducer in an attempt to produce a resonant frequency when the sensor end is open. This enables a fail-safe approach in that the tube must be either open or closed (neglecting a small "transition range" where the tube is neither open nor closed).

The principles of the present invention further provide for a method of determining whether a material being sensed has reached a predetermined level. In such a method a sensor end of a tube is located at the predetermined level. An acoustic frequency attempts to create standing waves in the tube. The acoustic frequency is stopped, and the acoustic decay in the tube is monitored. A determination is then made as to whether standing waves occurred, and, based on that determination, a signal is produced that identifies whether the material being sensed has reached the predetermined level.

DETAILED DESCRIPTION OF THE INVENTION

Figure 1:
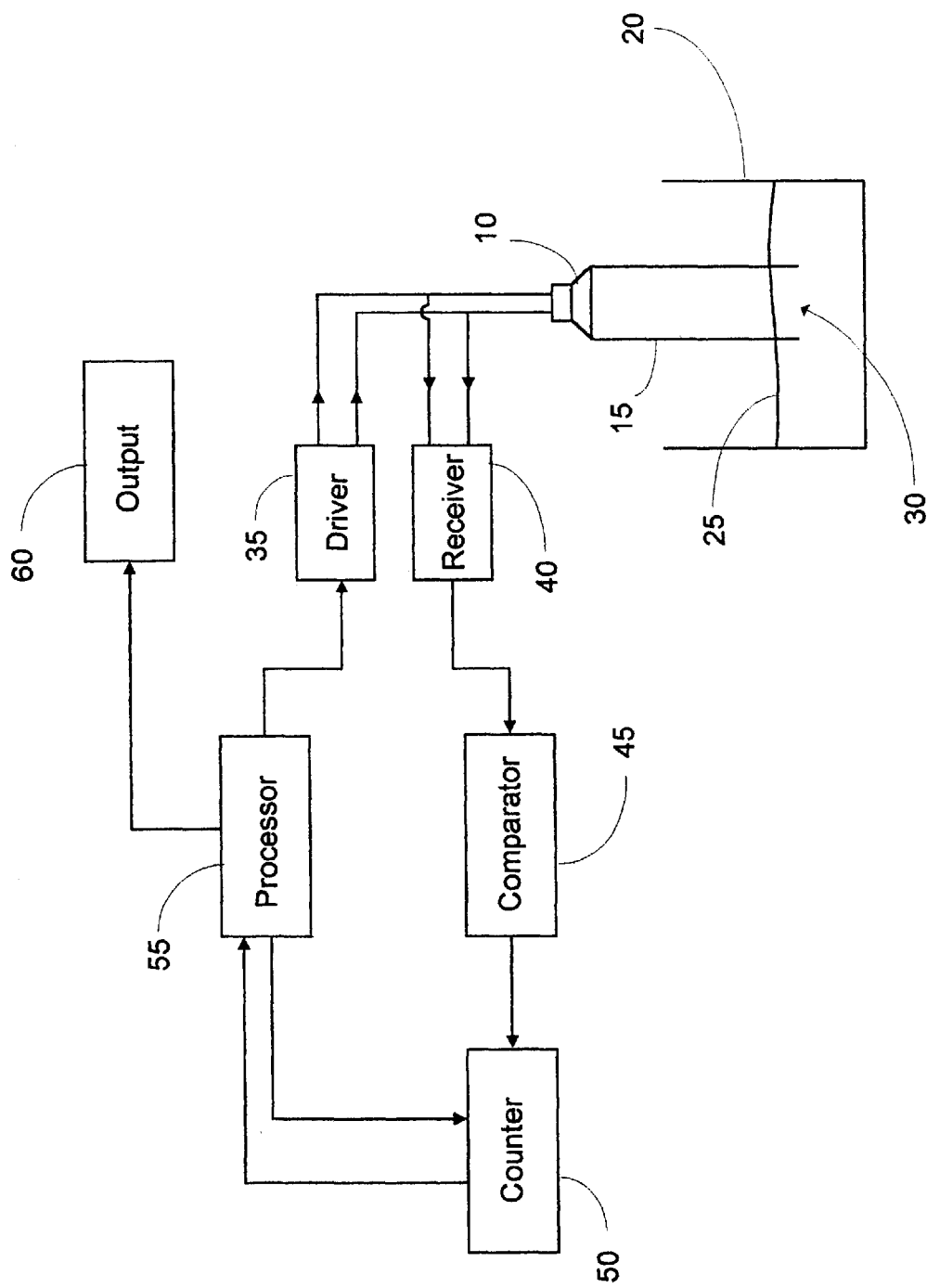
FIG. 1, the sole figure, is a block diagram of a point level sensor that is in accord with the principles of the present invention and that is in operation sensing the level of a material.

The principles of the present invention provide for point level sensors that are suitable for sensing numerous materials. While those principles are incorporated in the point level sensor shown in FIG. 1, it is to be understood that numerous alternatives, variations, and adoptions of those principles are possible. Therefore, the present invention is limited only by the claims that follow, when those claims are understood in light of the patent laws of the United States.

A point level sensor in accord with the principles of the present invention is shown in operation sensing the level of a material in FIG. 1 (the sole figure). As shown, a transducer 10 is located so as to be able to inject sound into a tube 15. That tube is beneficially located in a tank 20 that holds a material 25. The free end 30 of the tube is positioned at the sensing point.

The transducer 10 is beneficially a piezoelectric buzzer, such as Radio-Shack part number 273-059. That buzzer, which is listed as having a resonant frequency of 2700, ±500 Hz, beneficially has a "nodal" mounting of the piezoelectric element to case, which acts as a Helmholtz resonator. The disadvantages of Radio-Shack part number 273-059 is that the case and the adhesives that holds the piezoelectric element to case may not last long in caustic environments and the piezoelectric element itself is not environmentally protected. In particular, moisture is understood as being harmful to the piezoelectric element. Since the sensor is in a tube, the interior of the tube will be at 100% humidity.

Therefore, improved case materials (say brass since the piezoelectric element includes brass) and adhesives (say a flexible epoxy) may be better in some applications, while a protective coating (say a thin, flexible epoxy coating) on the piezoelectric disk may be beneficial.

The tube 15 is beneficially a 3.5" length of ¾" PVC, 100 PSI plumbing tube, with a mount at one end that holds the piezoelectric buzzer. Some type of corrosive resistant tube should be used in harsh environments. In the system of FIG. 1, the piezoelectric buzzer is simply glued to one end of the tube 15 using a flexible silicon adhesive/sealant.

A driver 35 drives the transducer 10 such that the transducer produces sound that could produce resonance in the tube 15, with resonance being dependent upon whether the material 25 has or has not closed the free end 30. For example, ideally, if the free end of the tube is closed by the material 25 the tube 15 will resonate when the sound has a frequency Fc:

$$Fc = nc/2L, \quad n=1, 2, 3, \ldots$$

where c is the speed of sound in the tube, and L is the length of the tube.

Alternatively, ideally, if the free end of the tube is open, the tube 15 will resonate when the sound has a frequency Fo:

$$Fo = (2n-1)c/4L, \quad n=1, 2, 3, \ldots$$

Where L is now the effective length of the tube. Effective length means the actually distance between the transducer 10 and the end of the tube, plus an "end correction factor" that depends on the diameter of the free end. Testing shows that an end correction factor is about 0.6 to 0.8 times the diameter of the free end.

In either case, the presence or absence of resonance depends upon whether the material 25 has or has not closed the free end 30.

Testing has shown that the "ideal" situation does not typically occur. By frequency scanning the tube 15 (driving the transducer at multiple, discrete frequencies) using squarewaves, the presence of numerous strong and weak resonances can be found. This is believed to be caused by multiple frequencies being produced by the transducer 10. Furthermore, the transducer and its case each have their own resonances that interact with the tube. However, it appears that the shorter the tube the closer to the ideal the systems operates. However, I have not achieved a strong resonance with the free end closed near an "ideal" closed circuit resonance.

The driver 35 does not drive the transducer 10 continuously. The driver simply drives the transducer 10 long enough to produce a strong resonance in the tube 15. For example, the driver 35 drives the transducer 10 with 256 cycles, which is sufficient to produce strong resonances. After the driver 35 completes it drive of the transducer the driver switches to a high impendence state (see below).

A receiver 40 then amplifies electrical signals from the transducer 10. As noted above, the driver is in a high-impedance state. Actually, one leg of the driver is beneficially forced to ground while the other leg is in a high impedance state. This has been found to work well enough that a differential amplifier in the receiver's front end is not required. The receiver 40 is comprised of two stages of amplification. The actual gain used is not known, but a lot of gain (say ×500) should be available. One dual high-speed op-amp, such as the TL082, can be used for both input stages. I suggest that a non-inverting amplifier configuration be tried first. One stage beneficially includes a gain control.

The output of the receiver is applied to a comparator 45 that converts the amplified signals into digital pulses. The common LM311 comparator works well.

The pulse outputs of the comparator 45 is then input to a counter 50. The operation of the counter 50 is controlled by a processor 55, which also controls the driver 35. After the processor 55 stops the driver 35 and places it into its high-impedance state, the processor delays for a short period of time (say 8 millisecond) to give the transducer 10 time to stop ringing. Then, the processor 55 resets the counter 50. Thus, the counter is zeroed. Then, the counter 50 begins counting the pulses from the comparator 45 which represent the sound decay in the tube 15. If resonance occurred, that sound decay produces a relatively larger number of pulses. Otherwise, few or no pulses occur. After a period of time that is sufficient for the resonance to decay, say about 0.8 seconds, the processor 55 reads the content of the counter 50.

After the processor 55 has read the counter 50, the processor makes a decision as to whether resonance has or has not occurred. This decision is based on the content of the counter 50 and an internal "trip point" stored within the processor. If the counter reading is high enough (see below), the processor determines that resonance occurred, otherwise the processor determines that resonance did not occur. Based on that decision the processor determines whether the material 25 being sensed has reached the free end 30. The processor then causes an appropriate output from an output device 60, such as a signal light, a relay, or a controller.

In practice, the counter 50, processor 55, and the driver 35 are functions of a microcontroller. For example, the system shown in FIG. 1 uses a Microchip 12C508 microcontroller, which is a small, 8 pin device having an internal counter. In practice, it is important to avoid overflow of the Microchip 12C508 counter by using a divider.

The foregoing has described the operation of the point level system shown in FIG. 1. I fully believe that others will have no difficulty building, testing, and using point level sensors according to the principles of the present invention. However, as indicated earlier, the system's operating frequencies are not ideally. Thus a further discussion of what to expect may save others work.

First, the length of the tube is not critical, but something between 3.5" to 6" should work well. Furthermore, looking for an "open" free end seems to work the best. To discover these things, I added an RS-232 bi-direction interface to the 12C508 microcontroller. Then, using a personal computer, I caused that microcontroller to take a counter measurement at a high frequency (5051 Hz) by seeing how many pulses were counted by the counter after 256 cycles of that frequency were produced. That reading was then sent to the personal computer for display, and then another reading at a slightly lower frequency was taken. This "frequency scan" was repeated numerous times down to the lowest frequency I had available (731 Hz). By the way I generated frequencies I had relatively large frequency steps at high frequencies and smaller frequency steps at lower frequencies. Furthermore, my receiver gain was adjusted until I had "acceptable" counter readings, readings that did not overflow the counter but that clearly distinguished the sound decay of a resonance condition from sound decay in a non-resonance condition. Then, that gain was fixed for all remaining testing. While what follows is not scientifically precise, the results should be useful.

I ran frequency sweeps using tubes having lengths of 5.5", 3.5" and 2.7", both with the free end open and closed. I obtained numerous high counter readings (say greater than 45) with the free end open, but never received any such high readings with the free end closed (the highest was a couple of 12 readings). However, the readings at a closed free end did produce relatively high readings near the natural resonant frequency of the tubes. Thus, any one, possibly more, of the high readings can be used to operate the system. For example, the 3.5" long tube produced high readings over a wide frequency range (readings in parenthesis): 4167 Hz (42); 4274 Hz (60); 4386 Hz (97); and 4505 Hz (43). In my opinion, this is the best combination of frequency span and readings I found. When the free end of the same tube was closed I obtained readings of: 4167 Hz (3); 4274 Hz (2); 4386 Hz (2); and 4505 Hz (2). So, over a 338 Hz span I obtained at least 14 times more pulses when the tube is open as when it is closed. This should enable operation without temperature compensation over a relatively large temperature range.

While the system does not work well using the "ideal" resonant frequencies of a tube, it works remarkably well with a particular tube-transducer-frequency combination, both with an open tube and a closed tube.

It is possible to use multiple frequencies as a "safety" check. For example, it is possible to test at one frequency, determine a result, and then verify that result using another frequency. For example, the 3.5" tube discussed above also produced these results when the free end is open: 1449 Hz (47); 1462 Hz (39); 1475 Hz (63); 1488 Hz (39). When the free end was closed:1449 Hz (2); 1462 Hz (1); 1475 Hz (1); 1488 Hz (0). So a reading taken at 4386 Hz could be verified using a frequency of 1475 Hz.

Alternatively, another "safety" check is to test for an open free end at one frequency, and then look for a closed free end at another frequency. For example, a 3.5" tube produced these results when the free end is open: 1832 Hz (0); 1852 Hz (0); 1873 Hz (0); 1894 Hz (0). When the free end was closed: 1832 Hz (5); 1852 Hz (7); 1873 Hz (7); 1894 Hz (6) So a reading taken at 4386 Hz could be verified by looking at 1852 Hz.

The general operating procedure of the sensor system shown is FIG. 1 is as follows. First, find a set of frequencies that produce acceptable readings given the particular transducer and tube. Next, transmit a predetermined number cycles at an acceptable reading. Then, turn the transmitter off and delay slightly (say 8 ms) for the transducer to stop self vibrating. Then, count the number of amplified "sound decay" cycles that are received. Then, compare that number to an acceptable "trip number" that is used to designate when resonance occurs. Determine if the free end is open or closed, relate that determination to whether a material has closed the free end, and produce a suitable output.

The acceptable trip number discussed above should be determined based upon the system in issue. For example, if at frequency A one produces a count of at least 40 when the free end is open, and a count no higher then 5 when the free end is closed, an acceptable trip number might be 22.

The acceptable trip number can also be arrived at by measurement. First, take a reading at a frequency that does not produce resonance either when the free end is open or closed. Then, increased that number to a suitable trip number (say double it). For example, if frequency B produces a reading of 4, an acceptable trip number might be 8.

Another, possible better way to arrive at an acceptable trip number is to frequency average counts over a number of periods. For example, use 10 as an initial trip number. Then when a reading of 25 occurs, average the readings to 17 or 18. Keep updating the readings until a system max occurs (say half of the highest reading). Basically, an acceptable trip number will depend on the system, the readings that typically occur when the free end is open, and the readings that occur when the free end is closed.

A couple of additional thoughts. I have used piezoelectric sound generators because they are readily available, have the correct physical dimensions to use with readily available tubes, are low cost, and are generally easy to work with. However, I believe that they produce a wide spectrum of sound, particularly when driven by squarewaves, which is why I thing my resonance frequencies are not ideal. Basically, driving a piezoelectric element at frequency A might produce sound at frequency A, but I believe that it also produces sound at frequencies B, C, D, . . . where those frequencies are not necessarily harmonics or overtones. Furthermore, because of the poor performance of the resonant system described above when the free end is closed, I believe that piezoelectric transducers produce sound frequencies that tend to cancel out closed free end resonances.

Regarding piezoelectric elements, there are, in general, three different ways to mount such elements in a case: center mount, nodal mount, and edge mount. There are also two different types of edge mountings: rigid clamp and flexible mount. Given the results currently available, nodal mounting clearly works the best. Rigid edge mounting works poorly. Furthermore, center mounting has been found difficult to do and acceptable results have not yet been achieved. Flexible edge mounts conceptually have promise, but again, results are not yet available.

It is to be understood that while the figures and the above description illustrate the present invention, they are exemplary only. Others who are skilled in the applicable arts will recognize numerous modifications and adaptations of the illustrated embodiments that remain within the principles of the present invention. Therefore, the present invention is to be limited only by the appended claims.

What I claim is:

1. A level detector for determining whether a material has reached a sensing position, said level detector comprising:
    a tube having a first end for locating at a sensing position and a second end;
    a transducer at said second end;
    a driver for driving said transducer at a first frequency for a time that is sufficient to produce resonance in said tube;
    a decay sensor for producing a level signal that indicates whether the material has reached the sensing position, wherein said level signal depends on whether said first frequency produced resonance in said tube, wherein said resonance depends on whether the material has reached the sensing position, and wherein said decay sensor monitors the decay of said first frequency in said tube to determine if resonance was produced.

2. A level detector according to claim 1, further including a controller for causing said driver to drive said transducer at said first frequency.

3. A level detector according to claim 1, wherein said driver is further for driving said transducer at a second frequency that does not produce resonance, wherein said decay sensor is further for monitoring the decay of said second frequency in said tube, and wherein said decay sensor determines resonance by comparing the decay of said first frequency with the decay of said second frequency to determine if said first frequency produced resonance.

4. A level detector according to claim 1, wherein said transducer includes a piezoelectric element.

5. A level detector according to claim 1, wherein said first frequency produces resonance when the material is at the sensing position.

6. A level detector according to claim 1, wherein said first frequency produces resonance when the material is not at the sensing position.

7. A level detector for determining whether a material has reached a sensing position, said level detecting apparatus comprising:
    a tube having a first end for locating at a sensing position and a second end;
    a transducer at said second end;
    a driver for driving said transducer at a plurality of frequencies in an attempt to produce resonance in said tube, wherein said transducer is driven at each frequency of said plurality of frequencies for a time sufficient to produce resonance;
    a decay sensor for producing a level signal that indicates whether the material has reached the sensing position, wherein said level signal depends on whether resonance was produced in said tube, wherein said resonance depends on whether the material has reached the sensing position, and wherein said decay sensor monitors the decay in said tube of at least one frequency of said plurality of frequencies to determine if resonance was produced.

8. A level detector according to claim 7, further including a controller for causing said driver to drive said transducer at said plurality of frequencies.

9. A level detector according to claim 7, wherein said driver is further for driving said transducer at a base frequency that cannot produce resonance, wherein said decay sensor is further for monitoring the decay of said base frequency in said tube, and wherein said decay sensor determines resonance by comparing the decays of said plurality of frequencies with the decay of said base frequency to determine if said plurality of frequencies produced resonance.

10. A level detector according to claim 7, wherein said at least one frequency of said plurality of frequencies produces resonance when the material is at the sensing position.

11. A level detector according to claim 7, wherein said plurality of frequencies produces resonance when the material is not at the sensing position.

12. A level detecting apparatus according to claim 7, wherein said plurality of frequencies are selected to compensate the level detecting apparatus for changes in temperature.

13. A level detecting apparatus according to claim 7, wherein said plurality of frequencies are selected to compensate the level detecting apparatus for material entering said first end of said tube.

14. A level detector according to claim 7, wherein said transducer includes a piezoelectric element.

15. A method of determining whether a material has reached a sensing position, comprising the steps of:
    locating the first end of a tube at a sensing position;
    injecting sound waves having a first frequency into the tube cavity for a period of time that is sufficient to produce resonance in the tube; and
    determining whether the material has reached the sensing position by sensing whether resonance was produced in the tube, wherein resonance is sensed by monitoring the sound decay in the tube of the sound waves having the first frequency.

16. A method according to claim 15, further including the step of injecting sound waves having a second frequency into the tube cavity, wherein sound waves at the second frequency cannot produce resonance, and wherein resonance at the first frequency is determined by comparing the decay in the tube of the sound waves at the first frequency with the decay in the tube of the sound waves at the second frequency.

17. A method according to claim 16, further including the step of injecting a plurality of sound waves having different frequencies into the tube cavity, wherein sound waves of each frequency are emitted for a period of time that is sufficient to produce resonance in the tube.

18. A method according to claim 15 wherein sound waves having a first frequency produce resonance when the material is at the sensing position.

19. A method according to claim 15 wherein sound waves having a first frequency produce resonance when the material is not at the sensing position.

20. A method according to claim 15, further including the step of emitting a plurality of sound waves having different frequencies into the tube cavity, wherein sound waves of each frequency are emitted for a period of time that is sufficient to produce resonance in the tube.

* * * * *